(12) United States Patent
Gehring et al.

(10) Patent No.: US 6,597,683 B1
(45) Date of Patent: Jul. 22, 2003

(54) MEDIUM ACCESS CONTROL PROTOCOL FOR CENTRALIZED WIRELESS NETWORK COMMUNICATION MANAGEMENT

(75) Inventors: Stephan Gehring, Palo Alto, CA (US); William Lynch, Palo Alto, CA (US); Krisnawan Rahardja, San Jose, CA (US); Gerald Rogerson, Morgan Hill, CA (US); Carlton J. Sparrell, Palo Alto, CA (US)

(73) Assignee: Pulse-Link, Inc., San Diego, CA (US)

( * ) Notice: Subject to any disclaimer, the term of this patent is extended or adjusted under 35 U.S.C. 154(b) by 0 days.

(21) Appl. No.: 09/393,121

(22) Filed: Sep. 10, 1999

(51) Int. Cl.[7] .............................................. H04B 7/212
(52) U.S. Cl. ...................... 370/348; 370/347; 370/349; 370/350; 370/229; 455/422; 455/450; 455/451; 455/452; 455/516
(58) Field of Search ......................... 370/348, 229–240, 370/347, 349–350; 455/422–466, 500–525

(56) References Cited

U.S. PATENT DOCUMENTS

| | | | | |
|---|---|---|---|---|
| 5,537,414 A | * | 7/1996 | Takiyasu et al. | 370/347 |
| 5,627,829 A | * | 5/1997 | Gleeson et al. | 370/230 |
| 5,644,576 A | * | 7/1997 | Bauchot et al. | 370/337 |
| 5,742,592 A | * | 4/1998 | Scholefield et al. | 370/329 |
| 5,790,551 A | * | 8/1998 | Chan | 370/348 |
| 5,953,344 A | * | 9/1999 | Dail et al. | 370/443 |
| 5,960,000 A | * | 9/1999 | Ruszczyk et al. | 370/447 |
| 5,970,062 A | * | 10/1999 | Bauchot | 370/310.2 |
| 6,091,717 A | * | 7/2000 | Honkasalo et al. | 370/329 |
| 6,115,390 A | * | 9/2000 | Chuah | 370/348 |
| 6,226,277 B1 | * | 5/2001 | Chuah | 370/328 |
| 6,243,583 B1 | * | 6/2001 | Tsutsui et al. | 370/331 |

* cited by examiner

Primary Examiner—Thanh Cong Le
Assistant Examiner—Stephen D'Agosta
(74) Attorney, Agent, or Firm—Luce Forward

(57) ABSTRACT

A Medium Access Control protocol software architecture which comprises a microcode component providing the protocol implementation level functions and an engine component providing hardware level functions. The Medium Access Control protocol and method for use in a network system allows for centralized management of all MAC-level services by a master device. The Medium Access Control protocol provides an improved protocol message throughput via the sequence retransmission request protocol scheme. The Medium Access Control protocol provides a reduced data transmission latency and provides dynamic allocation of data slots within a Time Division Multiple Access frame definition. The Medium Access Control protocol also provides a set of failure management functions and power control support.

19 Claims, 11 Drawing Sheets

MEDIUM ACCESS CONTROL PROTOCOL FOR CENTRALIZED WIRELESS NETWORK COMMUNICATION MANAGEMENT

BACKGROUND OF THE INVENTION

1. Field of the Invention

This invention pertains generally to Medium Access Control protocol implementations. More particularly, the invention is a Medium Access Control protocol and method for use in a centrally managed network system at the Medium Access Control layer, which improves the throughput of protocol messages, reduces the latency of data transmissions and provides a set of failure management methods.

2. The Prior Art

Presently, there are numerous ways to provide communication algorithms between devices participating in a network offering various levels of reliability and effectiveness. Likewise, various protocol schemes have been developed to provide various networking services to such network devices.

In an effort to standardize protocols in network communication, the International Standards Organization (ISO) developed the Open Systems Interconnection (OSI) reference model. The OSI reference model deals with connecting systems that are open for communication with other systems and includes seven layers of network services including the Application or "highest" layer, the Presentation layer below the Application layer, the Session layer below the Application layer, the Transport layer below the Session layer, the Network layer below the Transport layer, the Data Link layer below the Network layer, and the Physical or "lowest" layer below the Data Link layer.

The Data Link Layer is designed to offer various services to the Network layer. The principal service that the Data Link layer provides to the Network layer is transferring data from the Network layer of a source device to the Network layer on the destination or target device. The usual approach is for the Data Link layer to break up the bit stream into discrete blocks of bits, compute a checksum for each block, transmit the block along with the checksum to the target device in the form of a packet. When a packet arrives at the target device, the checksum is recomputed for the received block. If the newly computed checksum is different from the checksum provided by the source device, the Data Link layer identifies that an error has occurred and an error-recovery process is invoked.

At the Medium Access Control (MAC) sublayer of the Data Link layer, protocols are used to solve the issue of which network device gets to use the broadcast channel when there is competition for it. The MAC layer is particularly important in Local Area Networks (LANs) where the number of network devices competing for the communication channel may comprise hundreds of devices.

One algorithm devised to provide MAC layer services is the ALOHA system which comprises a "regular" form and a "slotted" form. In the regular ALOHA framework packet transmissions can occur anytime, while the slotted ALOHA framework divides time into discrete time slots in which all packet transmissions must be synchronized, where the additional advantage provided is the increased throughput. A detailed treatment of slotted ALOHA protocols is provided by L. G. Roberts in "ALOHA packet system with and without slots and capture," Computer Communication Review, vol. 5, pp. 28–42, April 1975 and is incorporated herein by reference. The simplest version of the two approaches share a common process where the corresponding receiver of the packet acknowledges the transmitter the integrity of the transmitted packet which will be destroyed when overlapping transmissions from more than one transmitter occurs.

Another MAC algorithm is called Carrier Sense Multiple Access (CSMA), with its two most common versions as discussed here. The first is called 1-persistent CSMA which allows a transmitting device to first listen to the channel to determine if another device is transmitting at that moment. If the channel is busy, the node device waits until the channel becomes idle. When the station detects an idle channel, it transmits its packet. However, due to signal propagation delay, collisions still occur, as a channel may seem to be idle from pending transmitters that will then transmit their packets at approximately about the same time.

The second version is nonpersistent CSMA. In this framework, before sending, a device senses the channel and if no other device is using the channel, the devices will begin to transmit as in 1-persistent CSMA. However, if the channel is already in use, the station will not seize the channel immediately upon detecting of the end of the previous transmission. Instead, it waits for a random period of time and then starts to transmit.

These and other present implementations of MAC layer protocols lack the capabilities to support low-latency as well as throughput of protocol and data transmissions all on the same broadcast channel. Accordingly, there is a need for a reliable Medium Access Control protocol and method suitable for use in a centralized managed network system which improves bandwidth usage, improves throughput as well as latency of both protocol and data transmissions, and provides a set of failure-recovery methods. The present invention satisfies these needs, as well as others, and generally overcomes the deficiencies found in the background art.

BRIEF DESCRIPTION OF THE INVENTION

The present invention is a Medium Access Control (MAC) protocol and method for use in a network system employing centralized management of a common channel which is shared for protocol messages as well as data transmissions. The invention employs a modified slotted-ALOHA mode and a regular TDMA mode within a single TDMA frame definition. The MAC protocol improves the throughput of protocol messages, reduces the latency of data transmissions and provides a set of failure management methods.

In general, the MAC layer protocol of the present invention operates in a network system having a master device and a plurality of slave devices. More particularly, the MAC layer protocol is a software protocol provided and executed in the MAC sublayer of the Data Link layer according to the Open System Interconnect (OSI) standard. The Logical Link Control (LLC) sublayer forms the "top" or "upper" half of the Data Link layer and provides virtual linking services. The MAC sublayer forms the "bottom" or "lower" half of the Data Link layer and provides the services described herein. The software protocol is executed and operates on circuitry or like hardware as is known in the art within the master and slave devices on the network at the MAC layer.

The software architecture of the present invention includes a protocol "engine" component and a protocol "microcode" component. The "engine" component, which consists of software and hardware parts, provides the execution of the microcode component and hardware-related routines and interfaces necessary at the MAC layer, including, for example, hardware set and reset routines, interfaces to the Physical (PHY) layer, and interfaces to the data transfer hardware.

The microcode component provides the actual software implementation for the protocol. The microcode component provides the engine component with the necessary software instructions, routines and other software definitions necessary to perform the protocol tasks of the present invention. This bifurcated protocol architecture allows updates to one component to be made independently of the other component, thereby streamlining the process of protocol updates. For example, updates to the microcode can be carried out by transferring the updated microcode software to a flash memory device. The engine component is then capable of executing the updated microcode by accessing the flash memory device. Similarly, the software part of the engine component is available for updates.

The invention employs centralized management of "connection-oriented service," where the establishment of a connection between the source and destination device is achieved through a master device which carries out the operation of authorizing or otherwise managing all protocol communication between the source and destination slave devices.

The present invention also provides a Time Division Multiple Access (TDMA) frame definition for the exchange of protocol messages and other network data which is managed by the master device. In general, the master device carries out the operation of controlling and managing access to the TDMA frame and its sections. Before transmitting any network data on the TDMA frame, a requesting or source slave device must first register with the master device and then request authorization to establish a data link with a target device from the master device. Responsive to this data link request, the master verifies that the requested bandwidth is available within the network and that the target device is available to communicate with the requesting device, and then authorizes a data link between the requesting device and the target device. This arrangement provides for centralized management of the shared network transport between the various devices of the network.

By way of example, and not of limitation, the MAC protocol divides data transmission time into discrete data "frames" employing a Time Division Multiple Access (TDMA) frame definition. Frames are further subdivided into "sections". In a presently preferred embodiment, the TDMA frame comprises a Start-Of-Frame section (SOF), a command section, and a data slot section having a plurality of variable-length data slots. The SOF section is used by the master device for defining the start of each new frame so that each slave device can synchronize with the frame structure as set forth by the master device. Additionally, the SOF section may include codes for synchronizing clocks in the slave devices to the master clock in the master device. In the preferred embodiment, the master device transmits a unique bit code symbol, which does not appear anywhere else within the frame in the SOF section, to identify the start of each new frame. The unique bit code symbols are used by each of the slave devices on the network to ascertain the beginning of each frame from the incoming data stream.

The command section of the frame is used by the node devices of the network for exchanging protocol messages. Generally, a response to a message in the command section is transmitted in the command section of the next immediate frame. In the presently preferred embodiment, the command section operates in a "slotted ALOHA" mode and in a regular "TDMA" mode as managed by the master device. A detailed treatment of slotted ALOHA protocols is provided by L. G. Roberts in "ALOHA packet system with and without slots and capture," Computer Communication Review, vol. 5, pp. 28–42, April 1975 and is incorporated herein by reference. The present invention employs a modified slotted ALOHA protocol as described herein. The slotted ALOHA mode is used by the master device to invite protocol messages from the slave devices. For example, a first slave device may respond to an ALOHA command with a message requesting a data link with a second device in order to transmit data to the second slave device. Other responses to an ALOHA command may include a message indicating the device is starting up, shutting down, or is busy. Other protocol message replies or commands as is known in the art may also be used.

The data slots are used for data transmission between the devices of the network. Generally, the master device dynamically assigns a data slot to a slave device which is requesting to transmit data. The data slot assignment usually comprises a start time for transfer (slot start time) and a length of time for transfer (slot length). The slot start time corresponds to the time position within the data slot section of the frame at which point the device begins its transmission. The slot length measured from the slot start provides the time position within the frame at which transmission is terminated for that the frame. The slot length corresponds to the bandwidth allocated to the device within the data section of the frame.

The flow of protocol messages communicated between the devices on the network is governed by an approach called the sequence retransmission request (SRQ) protocol. In this framework all slave devices participating in the network are structured and configured as finite-state machines, each having at least an offline state, an online state and an engaged state. The protocol messages communicated between the slave and the master devices are considered "state-changing messages". Also defined by the SRQ protocol approach are a plurality of protocol sequences including, for example, the registration (discovery) sequence, the link request sequence, the link termination sequence, confirmation sequence, etc., where each protocol sequence includes several transmissions of protocol messages. Effectiveness and success of the transmission of a protocol sequence are acknowledged at the completion of the entire protocol sequence rather than immediately after the transmission of each message as in the traditional Automatic Retransmission reQuest (ARQ) approach. Because a protocol sequence may include a plurality of protocol messages, the overhead associated with acknowledging each protocol message is avoided, and bandwidth use is improved thereby. As noted above, protocol messages are issued in the command section of the TDMA frame.

In the present invention, the positive or negative acknowledgement of the success of a protocol sequence is communicated via a state change of the target device. Confirmation of the state change is preformed through the confirmation sequence made available to the requesting device. From this confirmation sequence, the requesting device will be notified if the desired state of the target device is not achieved which will then trigger the requesting device to repeat the past protocol sequence. The process is repeated until the desired state is achieved.

In another aspect of the present invention, the MAC protocol software provides failure-recovery methods for handling protocol sequence failure as well as non-protocolrelated errors, for instance due to power failure or interfering signals. The MAC protocol provides routines which allow the master device to detect and maintain the state of each slave device. Generally, each slave device carries out the operation of ascertaining and maintaining its internal state. The slave devices also periodically communicates its state to the master device in response to an "ALOHA" message or a "POLL" message from the master device. The master device carries out the operation of ascertaining and maintaining information about the state of all slave devices on the network from the state information provided by the slave device. This state information is normally stored on a master state table residing within the MAC layer of the master device.

The master device will periodically issue a "POLL" message in the command section directed at registered slave devices. Responsive to this POLL command, a registered slave device issues a reply indicating its current state. This method ensures that the master state table contains the most current information about the state of all slave devices, thereby avoiding transmissions to devices that are unavailable when requests are made by a source device to the master device.

Also included is the failure-recovery mechanism which detects, and recovers from, errors occurring at the protocol packets that may occur when protocol messages collide. Protocol collisions arise when two or more slave devices issue a reply to the master device in response to an ALOHA broadcast from the master device. Collisions are detected by error-checking functions as in known in the art within the master device.

In a presently preferred embodiment, collisions are resolved using random-delay functions within the slave devices. A collision is detected by a slave device when the master device fails to respond to the slave device's protocol request because the master device will not respond to collided/corrupted protocol messages. When a slave detects a collision due to its protocol message, the slave device will generate a random number which dictates when the slave device may respond to an ALOHA message. For example, if the random number generated by the slave device is a three (3), the slave device will wait for three ALOHA messages before responding with its pending protocol message.

In alternative embodiment, collisions are resolved with collision-resolving function in the master device. When a collision is detected by the master device, the collision-resolving algorithm provides a subset list of slave devices to which the master device directs subsequent ALOHA broadcasts. Various searching and selecting methods known in the art may be used to generate the subset list of slave devices. This process of broadcasting to smaller subset lists of slave devices continues until collisions are no longer detected.

Another failure-recovery function provided in the invention comprises procedures for recovering from burst errors. Burst errors arise when sources outside of the network introduce signals within the transport medium thereby corrupting one or more frames. The "POLL" and "ALOHA" commands issued by the master device for managing the slave devices, the master state table and the failure-handling functions as described above for verifying protocol exchange error are normally sufficient to handle random errors within the command section but are not sufficient to handle burst errors. Burst errors corrupt the synchronization information in the SOF section. The invention provides that devices that are currently undergoing a state-transition are reverted to the previous original state of the device.

Furthermore, devices that cannot receive the framing and clocking synchronization codes in the SOF section are changed to the "offline" state after a predetermined amount of time subsequent to the detected corruption within the SOF section. Thereafter devices can attempt to synchronize with the master device to reestablish "online" status.

The invention also provides commands for controlling power in the devices of the network, which are also issued in the command section of the frame. The power control commands provide instructions for the transmit gain controllers within each network device to maintain the minimum transmit signal strengths required from one slave device to reach its corresponding partner slave devices on the network as well as to reach the master device. These power control features are particularly helpful in wireless networks in order to reduce power consumption and reduce wireless transmission interference.

The MAC protocol of the present invention may be utilized in various network configurations and topologies including, for example, guided or wired media as well as unguided or wireless media. The MAC protocol is particularly advantageous in wireless network configurations because of the error-correction and communication management features provided by the invention. Such an illustrative wireless network is a synchronous wireless network comprising a plurality of transceiver devices transmitting and receiving pulses using a baseband or "ultra wide band" transport. Under this network configuration the MAC protocol and method of the present invention provide communication management, flow control, and failure-recovery for the shared air transport medium.

An object of the invention is to provide a Medium Access Control protocol which overcomes the deficiencies in the prior art.

Another object of the invention is to provide a Medium Access Control protocol which comprises a microcode component providing the protocol level functions and an engine component providing device level functions and execution support for the microcode component.

Another object of the invention is to provide a Medium Access Control protocol and method for use in a network system which allows for centralized management of all MAC-level communication by a master device.

Another object of the invention is to provide a Medium Access Control protocol and method for use in a network system which provides a sequence retransmission request protocol scheme in a network comprising finite-state machine devices.

Another object of the invention is to provide a Medium Access Control protocol and method for use in a network system where the protocol and data transmission share the same transport channel which provides an improved protocol sequence throughput via a the sequence retransmission request protocol scheme.

Another object of the invention is to provide a Medium Access Control protocol and method for use in a network system where the protocol and data transmission share the same transport channel which provides an improved latency of both the protocol as well as the data transmissions.

Another object of the invention is to provide a Medium Access Control protocol and method for use in a network system which provide dynamic allocation of transmit data slots within a Time Division Multiple Access frame definition.

Another object of the invention is to provide a Medium Access Control protocol and method for use in a network system which provides failure-recovery functions and methods.

Another object of the invention is to provide a Medium Access Control protocol and method for use in a network system which provides power control functions.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Referring more specifically to the drawings, for illustrative purposes, the present invention is embodied in the apparatus shown FIG. 1 through FIG. 6 and the method outlined in FIG. 7 through FIG. 11. It will be appreciated that the apparatus may vary as to configuration and as to details of the parts, and that the method may vary as to details and the order of the steps, without departing from the basic concepts as disclosed herein. The invention is disclosed generally in terms of a Medium Access Control (MAC) protocol, although numerous other uses for the invention will suggest themselves to persons of ordinary skill in the art.

Figure 1:
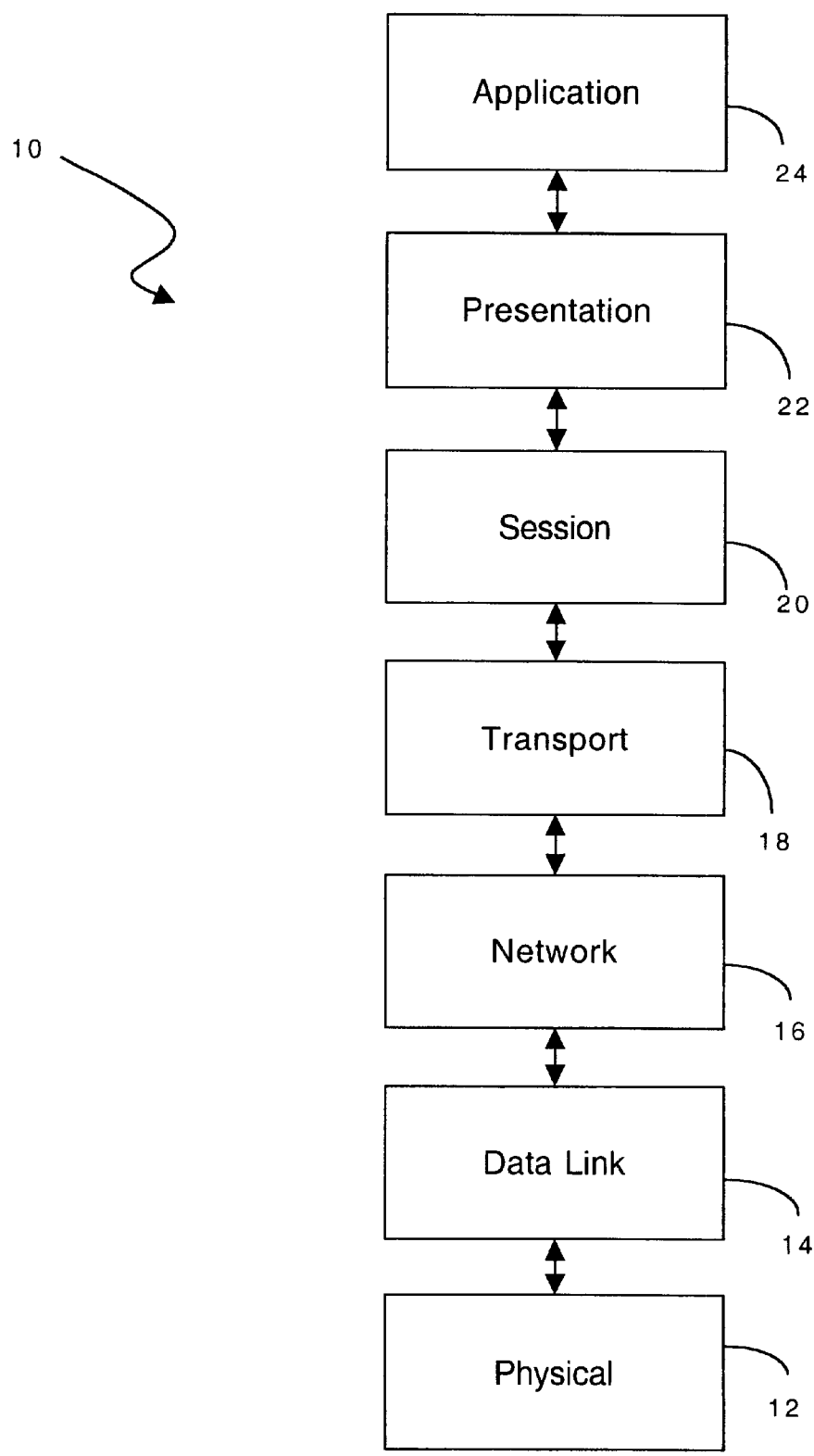
FIG. 1 is a prior art block diagram of the Open Systems Interconnection Reference Model.

Referring first to FIG. 1, there is shown generally a block diagram of the Open Systems Interconnection (OSI) reference model 10, which is based on a proposal developed by the International Standards Organization (ISO) as a first step toward international standardization of the protocols used in the various layers of network service. The OSI model includes seven layers, wherein each layer provides a different level of abstraction. The seven layers of the OSI model include the Physical layer 12, which is also the "lowest" layer, the Data Link layer 14, the Network layer 16, the Transport layer 18, the Session layer 20, the Presentation layer 22, and the Application layer 24 which is also the "highest" layer. Below the Physical layer 12 is the physical medium of communication through which actual communication occurs.

The purpose of each layer is to offer certain services to the higher layers, shielding those layers from the details of how the offered services are actually implemented. The main task of the Data Link layer 14 is to provide an interface between the Network layer with its packet-level data to and from the Physical layer with its bit-stream-level data. The MAC protocol of the present invention provides services to the MAC sublayer of the Data Link layer. As noted above, the Logical Link Control (LLC) sublayer comprises the other and upper portion of the Data Link layer. The present MAC protocol provides these facilities as well as other tasks by providing, among other things, management functions at the MAC level, which includes flow control protocols and failure management functions through a managing or master device, as described in more detail below.

The MAC protocol of the present invention may be used in a variety of network configurations and topologies including, without limitation, wired or guided networks and wireless or unguided networks. The network may include various devices as is known in the art including, without limitation, computers, monitors, televisions, hubs, routers, gateways, speakers, microphones, radios, compact disk units, video cassette units, digital video disk units, mini-disk units, and other appliance which may participate in a communication network.

Generally, the invention provides the MAC sublayer software which is executed on circuitry or like hardware (not shown) within devices of the network system as is known in the art. Typically, the MAC software is programmed into and executed on an integrated circuit or like hardware as is known in the art residing in the various network devices.

Figure 2:
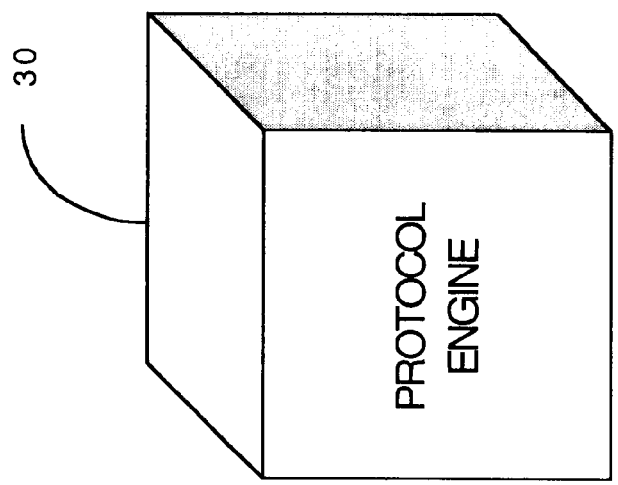
FIG. 2 is a block diagram of the software architecture of present invention.
Figure 2:
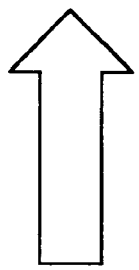
Figure 2:
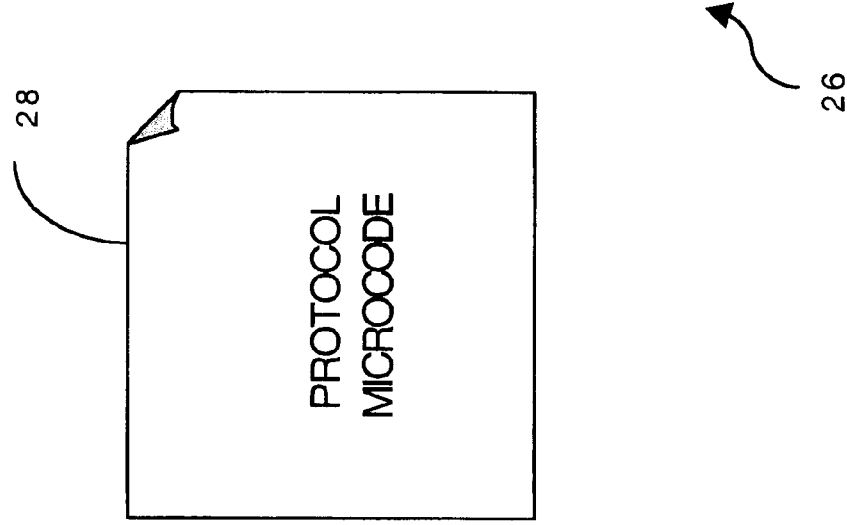

Referring now to FIG. 2, there is shown a block diagram of the software architecture 26 of the MAC protocol in accordance with the present invention. The software architecture 26 comprises a protocol microcode component 28 and a protocol engine component 30. The protocol engine component 30 comprises software and hardware parts which carries out the operation of providing the basic internal function such as hardware-related routines and interfaces necessary at the MAC layer of each device on the network. Such internal functions may include, for example, hardware set and reset routines, interfaces to the Physical (PHY) layer, and interfaces to the data transfer hardware. The protocol engine 30 also runs or otherwise executes the software associated with the protocol microcode 28 software. The protocol microcode 28 comprises the software implementation of the MAC protocol and is executed by the protocol engine 30 component. The microcode 28 software includes the functions and routines described herein.

Figure 3:
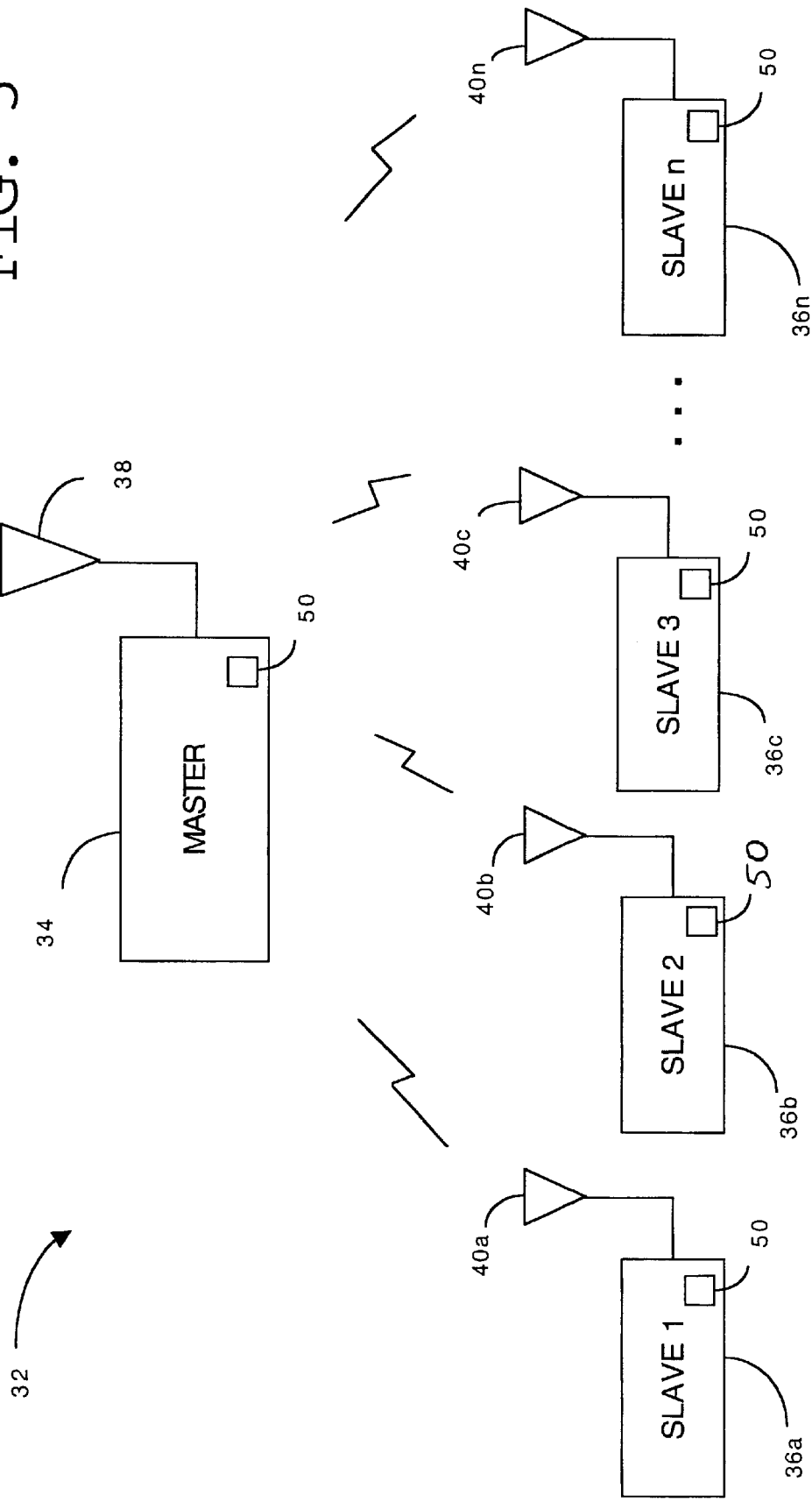
FIG. 3 is a block diagram of an illustrative network system in which the present invention may operate.

Referring now to FIG. 3 as well as FIG. 2, a block diagram of an illustrative network system in which the present invention may operate is shown and designated generally as 32. System 32 comprises a wireless communication network having a "master" transceiver device 34 and one or more "slave" transceiver devices 36a through 36n. Master device 34 and slave devices 36a through 36n include a transmitter or other means known in the art for transmitting data to the other transceivers of the network 32 via a corresponding antenna 38, 40a through 40n. Transceivers 34, 36a through 36n further include a receiver or other means for receiving data from the other transceivers via its corresponding antenna 38, 40a through 40n. As described further below, the protocol software provides functions and routines that are executed on the master device 34 which provide the management of network communication between all transceivers 34, 36a through 36n of the network 32. Each network device 34, 36a through 36n also includes circuitry or like hardware (not shown) as is known in the art for executing the protocol engine 30 and protocol microcode 28 of the present invention at the MAC layer of the device. In an illustrative embodiment, the data link protocol is run or is otherwise executed on an embedded processor within each device 34, 36a through 36n.

Figure 4:
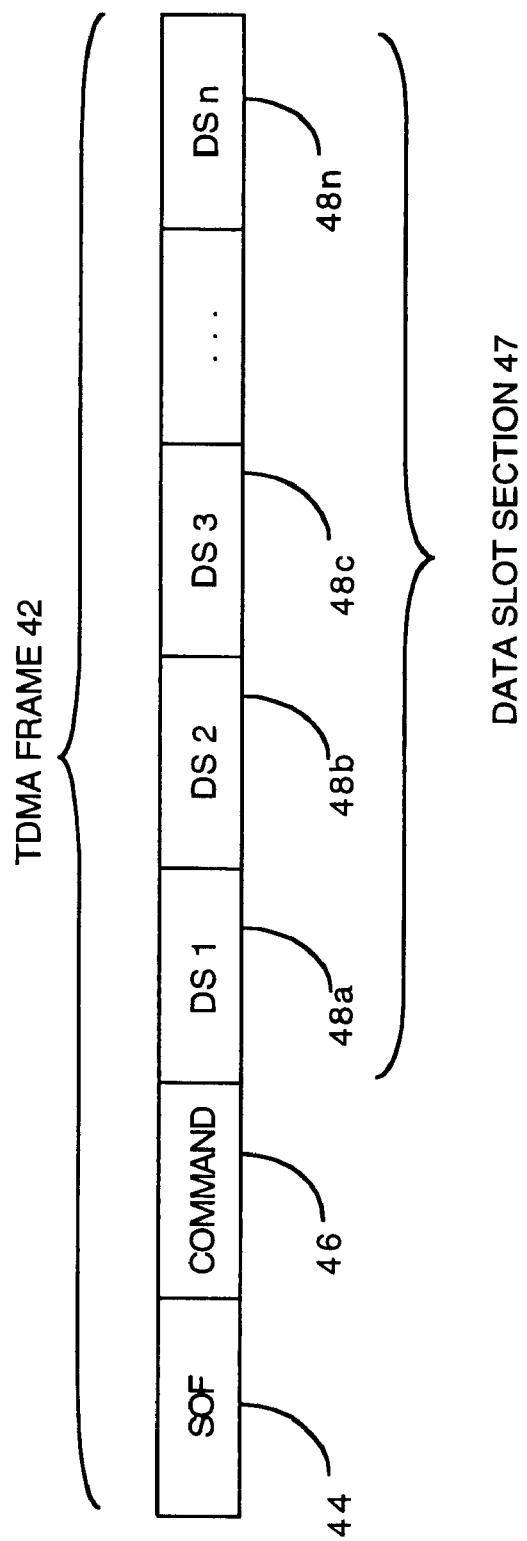
FIG. 4 is a block diagram of a Time Division Multiple Access protocol frame in accordance with the present invention.
Figure 5:
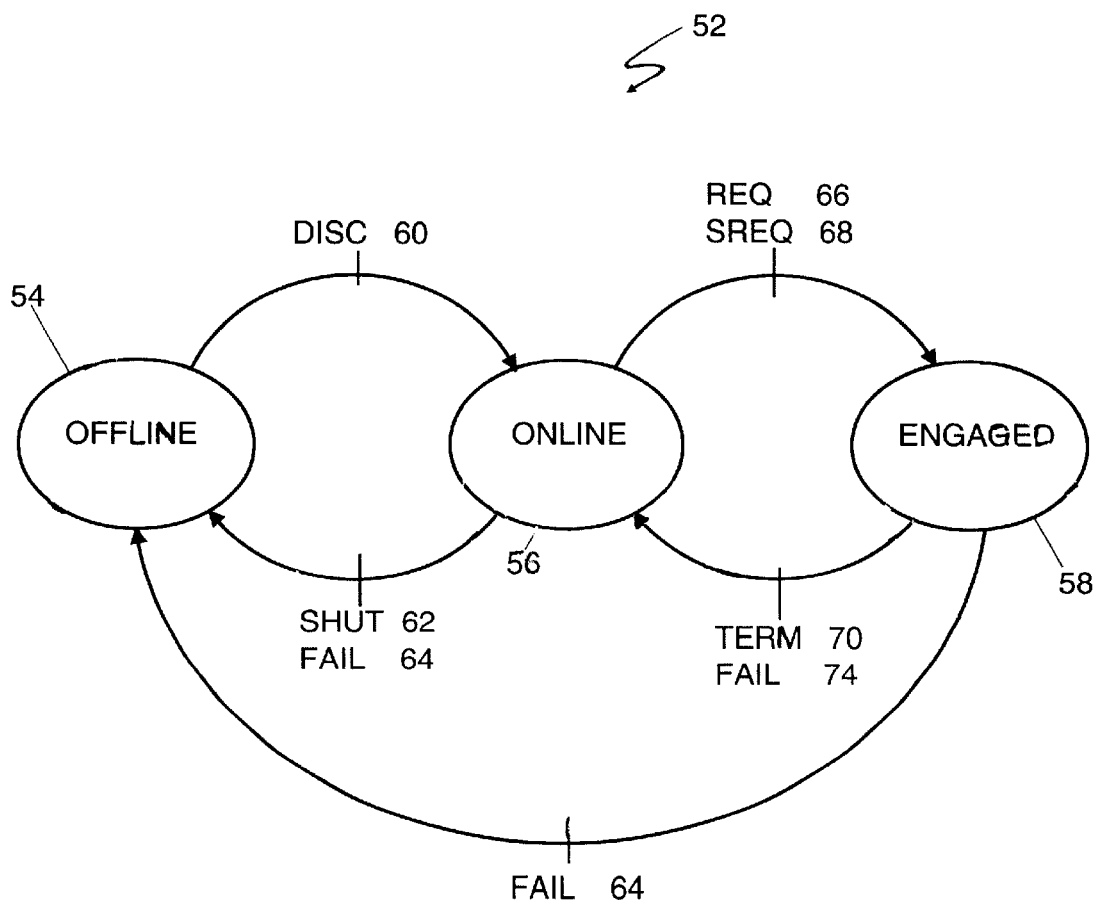
FIG. 5 is a state diagram showing the various states of a slave device.

Referring now to FIG. 4 as well as FIG. 2 and FIG. 3, a Time Division Multiple Access (TDMA) frame is shown and generally designated as 42. TDMA frame 42 is an illustrative frame arrangement provided by the MAC protocol of the present invention and is defined by the protocol microcode 28. In general, the MAC protocol provides the master device 34 with the functions and routines for carrying out the operation of managing each TDMA frame 42 which is communicated in the network system 32 as described below.

The MAC protocol of the present invention divides data transmission time into discrete data "frames" which are structured and configured as TDMA frame 42. Frames are further subdivided into sections. In the preferred embodiment, the TDMA frame 42 comprises a Start-Of-Frame (SOF) section 44, a command section 46, and a data slot section 47 which consists of a plurality of data slots 48a through 48n. The SOF section 44 contains a synchronizing beacon or "master sync" transmitted by the master device 34, which delineates the start of each new frame. More preferably, this "master sync" is structured and configured to be used for synchronizing timing clocks (not shown) residing in the slave devices 36a through 36n to a master clock (not shown) which resides in the master device 34.

The command section 46 contains protocol messages exchanged between the transceiver devices. Generally, each of the data slots 48a through 48n provides data transmission time for a corresponding slave device 36a through 36n of the network 32. In an alternative arrangement, the master device 34 dynamically assigns one or more of the data slots 64a through 64n to a requesting device. This arrangement allows the master device to dynamically allocate and manage the data slot usage to optimize the bandwidth capabilities of the transport medium of the network. In another alternative arrangement, the data slots may be structured and configured to have variable width or bit length as managed by the master device 34. Under this arrangement, the master device 34 may allocated a wider data slot to a slave device which can utilize the increase of bandwidth. Conversely, the master device may also allocate a narrower data slot to a slave device which has more limited bandwidth capabilities. The method of allocating and reallocating variable-width data slots is further described in copending patent application entitled "AN APPARATUS AND METHOD FOR MANAGING VARIABLE-SIZE DATA SLOTS WITHIN A TIME DIVISION MULTIPLE ACCESS FRAME" having attorney docket number "INT99-008" filed on Sep. 10, 1999 which is expressly incorporated herein by reference.

The protocol microcode 28 provides the framing control function 50 for the devices of the network. The framing control function 50 carries out the operation of generating and maintaining the time frame information. In the master device 34 the framing control function 50 delineates each new frame by Start-Of-Frame (SOF) symbols. In an illustrative embodiment, the SOF symbols are unique symbols which do not appear anywhere else within the frame and mark the start of each frame. The SOF symbols serve as the "master sync" and as the "master sync code" for the network and are transmitted in the master slot 44 of frame 42. These SOF symbols are used by the framing control function 50 in each of the slave devices 36a through 36n on the network to ascertain the beginning of each frame 42 from the incoming data stream. For example, in one illustrative embodiment, the invention utilizes a 32-bit SOF "master sync" code of "0111111110". Various encoding schemes known in the art may be use to guarantee that the SOF code will not appear anywhere else in the data sequence of the frame. A common encoding scheme for 8-bit data is a 4B/5B encoding scheme where 8-bit data words are encoded into 10-bit data words.

The master device 34 carries out the operation of managing network data communication via the exchange of "protocol messages" in the command section 46 of frame 42. The master device 34 carries out the operation of authenticating slave devices 36a through 36n, and assigning and withdrawing the variable data slots 48a through 48n for the slave devices 36a through 36n.

Master device 34 authenticates or registers each slave device by ascertaining the "state" of each of the slave devices of the network 32. Each device operates as a finite-state machine having at least three states: offline which is designated as 54, online which designated as 56, and engaged which is designated as 58.

Each slave device maintains and tracks its state by storing its state information internally, usually in random access memory (RAM) (not shown) or other memory means known in the art. The state of each slave device is further maintained and tracked by the master device 34 by storing the states of the slaves in a master state table (not shown) stored in RAM.

When a device is in its offline state 54, the device is considered "unregistered" and is not available for communication with the other devices on the network 32. Each slave device must first be "registered" with master device 34 before the slave device is assigned a data slot in the TDMA frame 42. In order to register a slave device, the slave device and the master device would engage in a "discovery" (DISC) sequence 60 as described in conjunction with FIG. 7 below. Once a device is registered with the master device 34, the device is considered "online" 56. A DISC message is communicated by a slave device to the master device 34 in response to an ALOHA broadcast to indicate that the slave device is signing on to the network. Responsive to DISC message from a slave device, the master device updates its master state table to reflect an online state 56 for the slave device and communicates a M-ACK signal to the slave device to indicate that the DISC message was successfully received.

A slave device that is in the "online" state 56 is ready to send or receive data from the other devices on the network 32. Additionally, a slave device is in the "online" state if it is not currently engaged in communication with other slave devices.

From the online state 56, a slave device transitions to the offline state 54, by engaging a shutdown (SHUT) protocol sequence 62 with the master device 34. A SHUT message is communicated by a slave device to the master device 34 in response to an ALOHA broadcast to indicate that the slave device is terminating its power. Responsive to SHUT message from a slave device, the master device updates its master state table to reflect an offline state 54 for the slave device and communicates a M-ACK signal to the slave device to indicate that the SHUT message was successfully received.

An online slave device also transitions to the offline state 54 when communication failures (FAIL) 64 occur. For example, when burst errors corrupt the "master sync" code in the SOF section 44 of the frame 42, which cause the slave device to not properly ascertain framing and clock synching information from the master device, thus making communication in the network impossible. Under these conditions, the invention provides each slave device with functions to revert their internal state to "offline" 54.

Additionally, the master device 34 periodically issues a "POLL" command to online and engaged devices in the network according to the master state table. Where a slave device fails to respond to a predetermined number of "POLL" messages, the master device sets the slave device to "offline" in the master state table.

A device in the online state 56 transitions to the engaged state 58 through a data link request sequence (REQ) 66 or a data link service request sequence (SREQ) 68. In general, the REQ 66 sequence comprises the protocol exchange between a requesting or source slave device and the master device 34, wherein the requesting device requests a data link with a target slave device. The REQ 66 sequence is set out in greater detail in conjunction with FIG. 8. The SREQ 68 sequence involves the protocol exchange between the master device 34 and the target device which happens after the master device 34 receives a REQ by the source device. The SREQ 68 sequence is described in more detail with FIG. 9. Once the corresponding SREQ has been authorized by the target device 34, the requesting device and the target device may engage in "data" or "non-protocol exchange" within designated data slot as authorized by the master device 34.

A device is "engaged" 58 when the device is currently transmitting and/or receiving data within the data slot section of the TDMA frame. When a data link is established through a REQ 66 and a SREQ 68 sequence as described above, both the requesting device and the target device are set to the engaged state 58. After completing the data transfer between the requesting device and the target device, both devices are returned to the online state 56 via a termination (TERM) 70 and a service termination (STERM) 72 sequence. The TERM 70 sequence involves the protocol exchange between the requesting slave device and the master device 34, wherein the requesting slave device requests to terminateof the data link with the target device. This sequence is described further in conjunction with FIG. 10. The STERM 72 sequence involves the protocol exchange between the master device 34, wherein the master device 34 terminates the data link between the requesting device and the target device. The STERM 72 sequence is described in further detail in conjunction with FIG. 11.

Certain data communication failures (FAIL) 74 and FAIL 64 may also arise during data exchanges via data links between two devices. As described above, FAIL 64 errors occur when signal corruption prevents a slave device from receiving the master sync in the SOF section 44 of the frame 42, and is thus unable to properly ascertain framing and clock synchronizing information from the master device, which is necessary for proper communication. Under these conditions, the protocol of the invention provides each slave device with functions to revert their internal state to "offline" 54.

FAIL 74 errors arise due to, for instance, power failure at the master device or slave device, or when interfering signals disrupt the network The command section 46 of the TDMA frame is structured and configured to operate in a "slotted ALOHA" mode and a traditional "TDMA" mode as determined by the master device 34. In general, the slotted ALOHA mode is used by the master device 34 to invite protocol messages from the slave devices. In operation, the master device 34 periodically broadcasts an ALOHA message in the command section 46 to invite slave devices to send their pending protocol messages. This arrangement is known as "slotted ALOHA" because all protocol messages including the ALOHA broadcast are sent during a predetermined time slot. In an exemplary embodiment, the ALOHA broadcast is transmitted every three seconds. Responsive to this ALOHA packet and in the next immediate TDMA frame, a slave device transmits its protocol message to the master device 34 in command section 46.

The regular TDMA mode is active when the master device 34 and a slave device responding to the ALOHA message are engaged in a protocol sequence. Such protocol sequences include, for example, the discovery sequence DISC 60, the shutdown sequence SHUT 62, the data link request sequence REQ 66, the data link service request sequence SREQ 68, the data link terminate sequence TERM 70, and the service terminate sequence STERM 72, among others. This mode continues until the entire protocol sequence is completed, followed by a transmission of a maintenance message by the master device 34.

Figure 6:
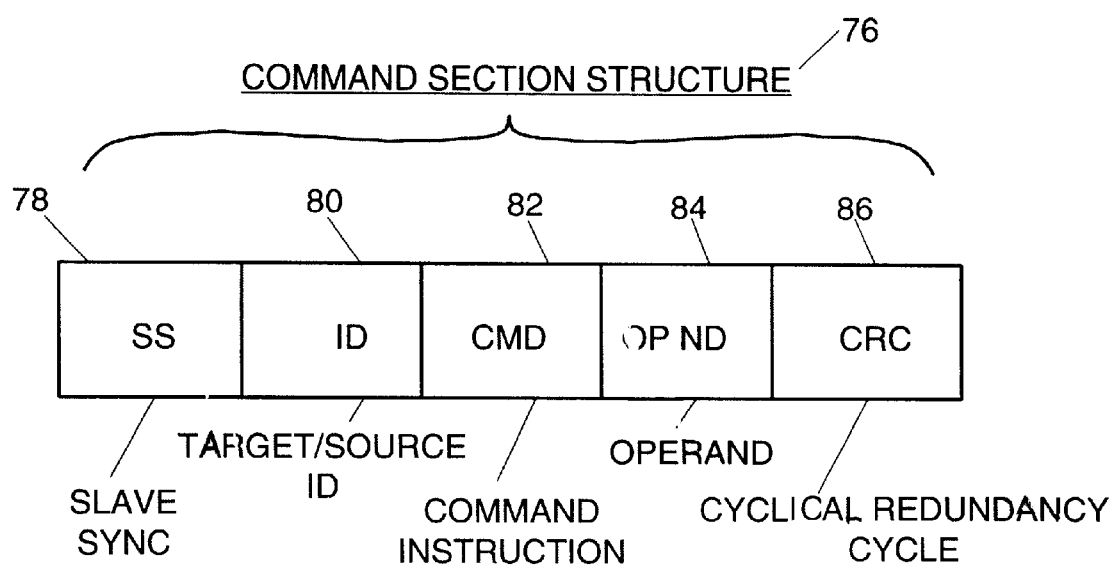
FIG. 6 is a block diagram of the command section structure of the Time Division Multiple Access frame of the present invention.

Referring now to FIG. 6 as well as FIG. 2 through FIG. 4, a block diagram of the command section structure of the TDMA frame is shown and designated as 76. The command section definition 76 in the TDMA mode includes a slave sync (SS) block 78, a target or source identification number (ID) block 80, a command instruction (CMD) block 82, an operand (OPND) block 84 and a cyclic redundancy check (CRC) block 86.

The SS block 78 accommodates a slave sync symbol which is transmitted from a slave device to the master device. Similar to the function of the SOF symbol, the slave sync symbol lets the master adjust its receiver phase to receive the incoming signal from the slave device. Normally in this synchronization process, phase adjustments within each device are made using phase lock loop or delay lock loop algorithms as is known in the art.

The ID block 80 accommodates the slave device identification number which uniquely identifies the slave device in the network which corresponds to the command in the CMD 82 block. For example, when a slave device 36n responds to a POLL command from the master device 34, the slave 36n identifies its unique identification number in the ID block 80.

The CMD block 82 accommodates a command or protocol instruction, and the OPND block 84 accommodates one or more corresponding operands for the command issued in the CMD block 82. Certain commands are issued by the master device 34 and others are issued by the slave devices 36a through 36n. In general, each command always includes one ore more associated operands.

An illustrative list of commands from the master device 34 includes ALOHA for announcing the slotted-ALOHA mode, POLL for polling the state of a slave device, MasterAcknowledge (M-ACK) for confirming functions, MasterNegativeACK (M-NACK) for negative-confirming function, MasterBusy (M-BUSY) for notifying a requesting device of the unavailability of a target device when establishing a data link, ServiceRequest (SREQ) for starting a data link between a requesting slave device and a target slave device, ServiceTerminate (STERM) for terminating a data link on an engaged slave device, ServicePowerUp (PUP) for increasing a slave device's transmit gain, ServicePowerDown (PDN) for decreasing a mobile's transmit gain, among others.

An illustrative list of commands from a slave device includes Discovery (DISC) for registering an offline slave device, Shutdown (SHUT) for unregistering an online slave device, Acknowledge (ACK) to confirms a slave device's current state, NegativeACK (NACK) for confirming the unavailability of a resource at a slave device, BUSY for confirming the unavailability for data link communication of a slave device, Request (REQ) for requesting a data link to a target slave device, Terminate (TERM) for terminating a data link with an engaged target slave device, PowerUp for triggering transmit power increase, and PowerDown for triggering transmit power decrease, among others.

The CRC 86 block provides an error detection support as is known in the art. One possible implementation involves 4-bit cyclical redundancy check (CRC) for 12-bit protocol data. Other implementations known in the art may also be used for providing error detection in the CRC block.

Figure 7:
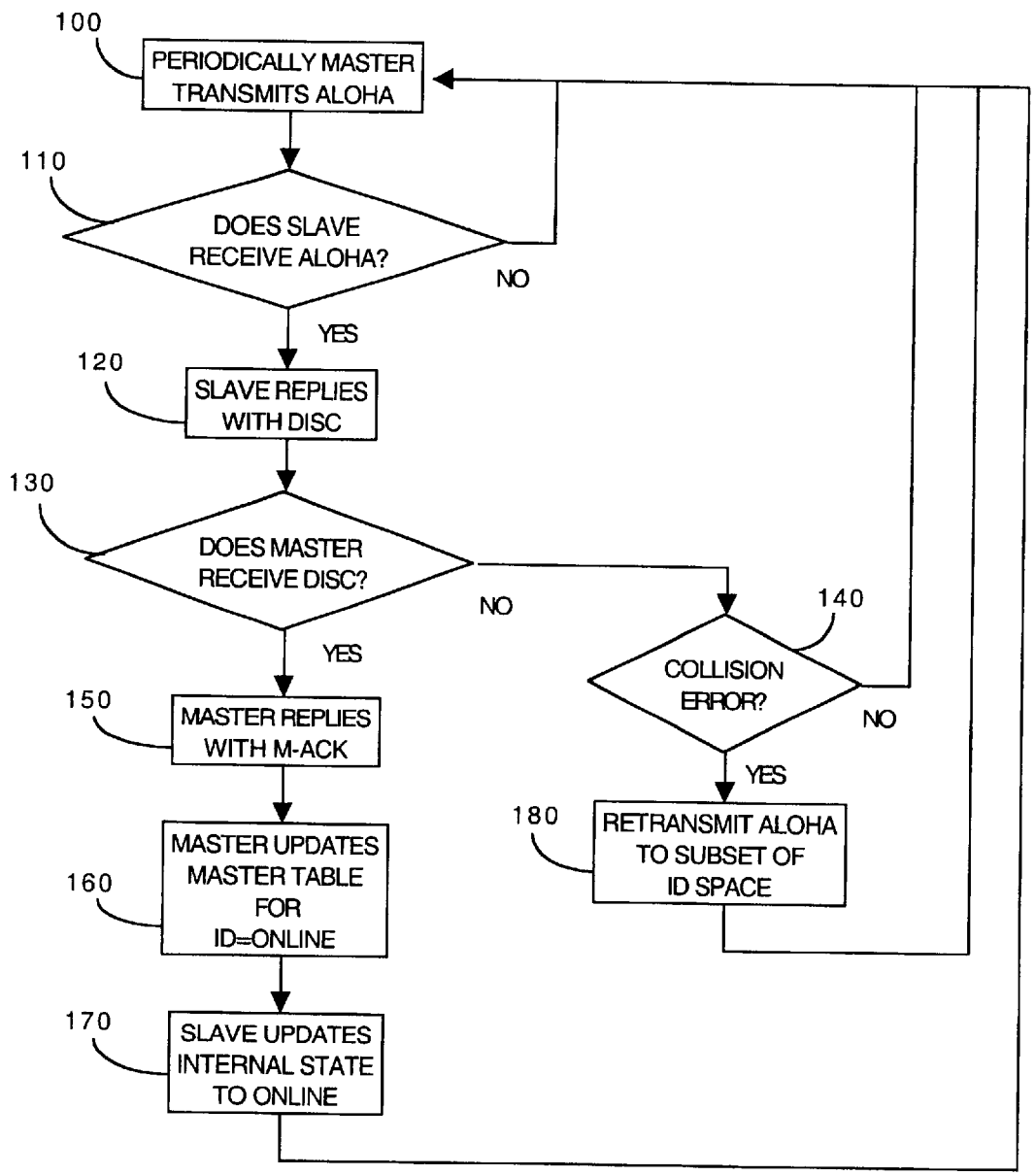
FIG. 7 is flowchart showing generally the steps involved in registering slave devices.
Figure 8:
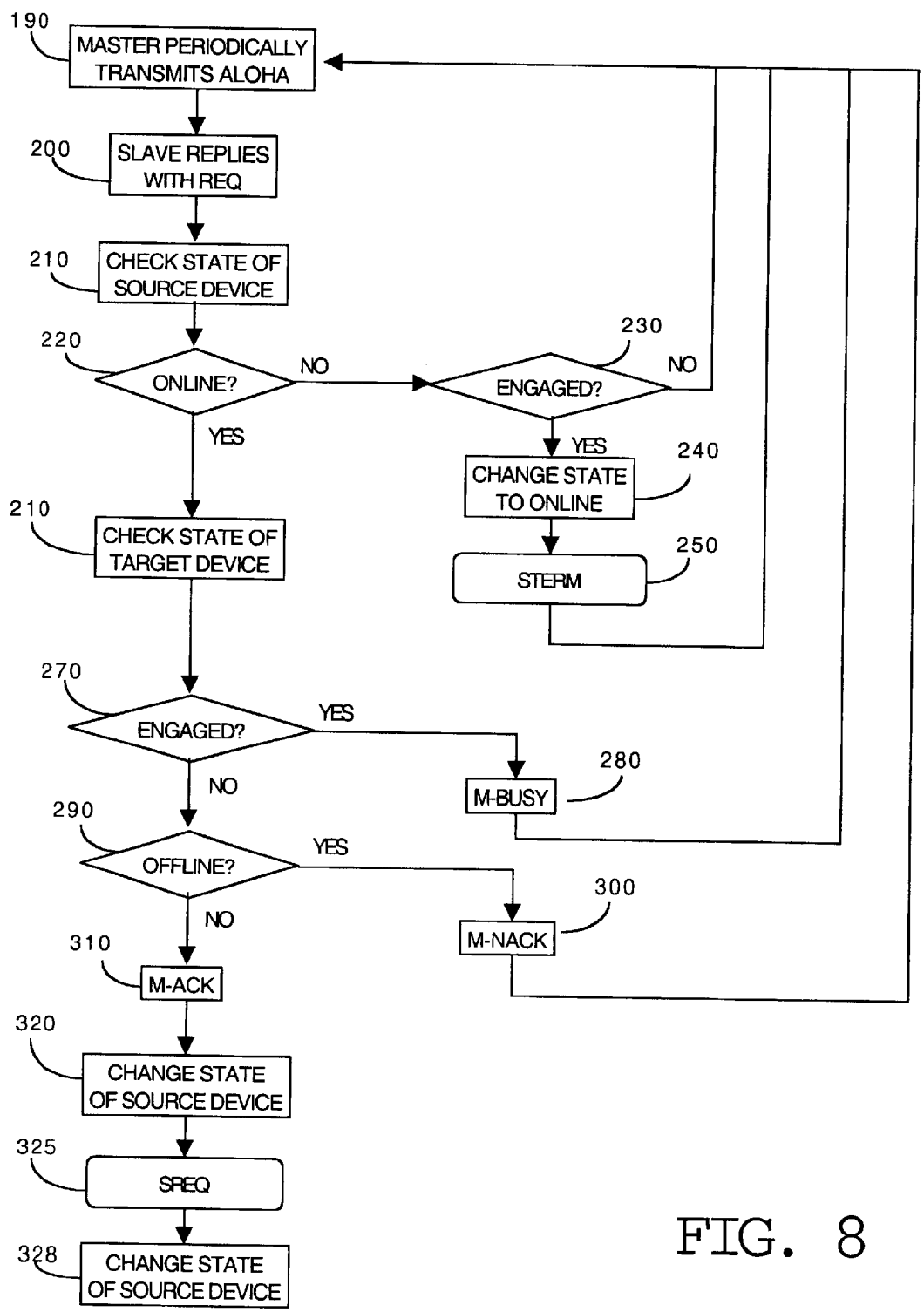
FIG. 8 is a flowchart showing generally the steps involved in a data link request sequence.
Figure 9:
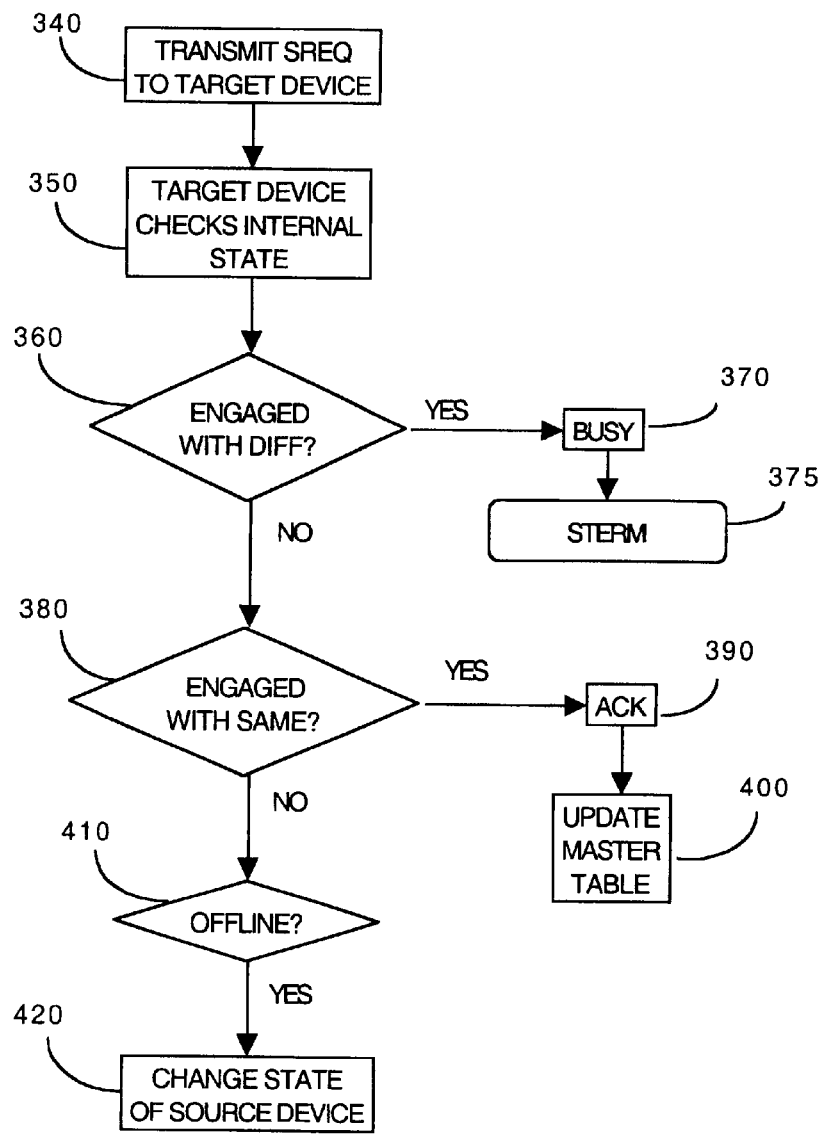
FIG. 9 is a flowchart showing generally the steps involved in a service request sequence.
Figure 10:
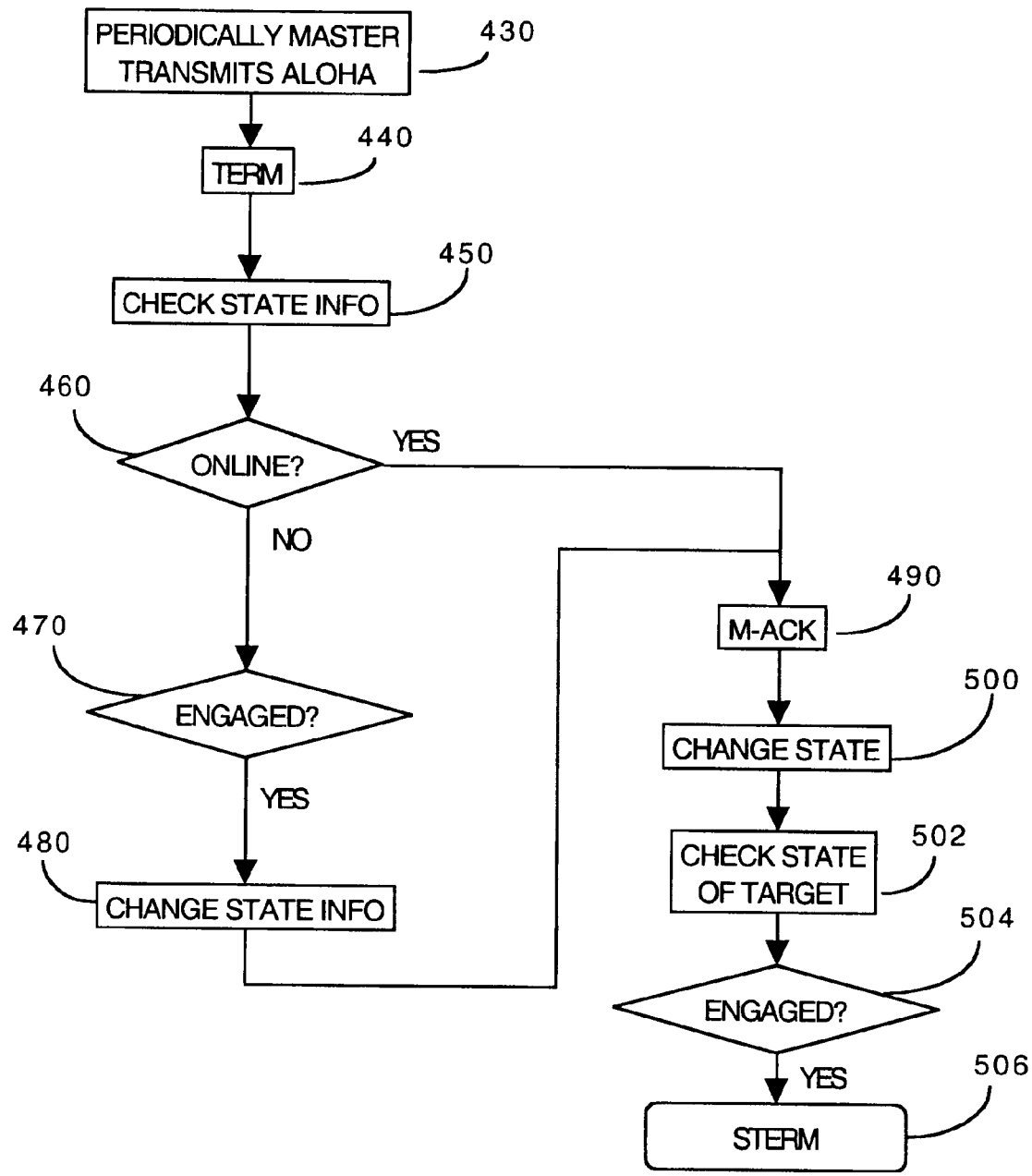
FIG. 10 is a flowchart showing generally the steps involved in a data link termination sequence.
Figure 11:
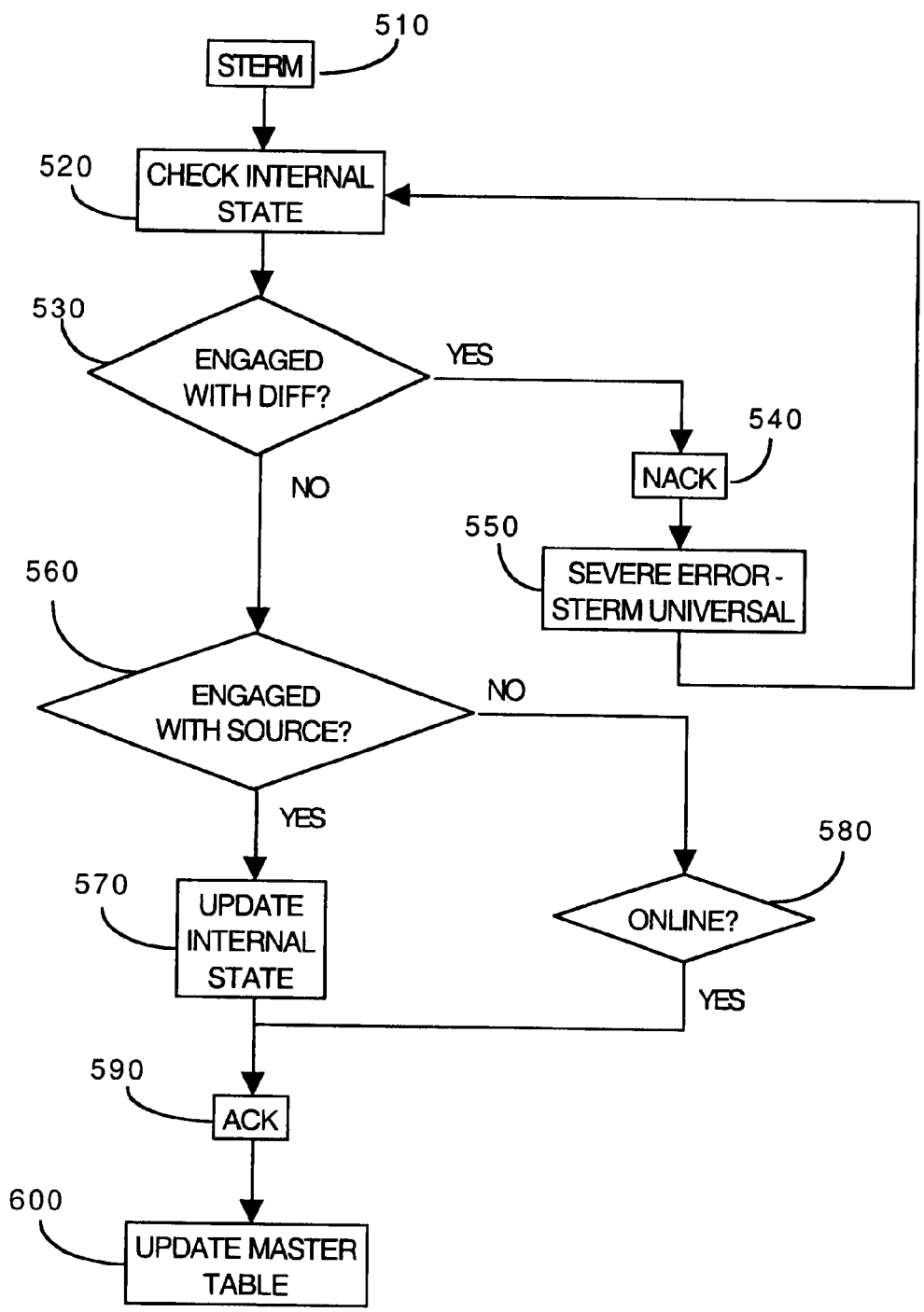
FIG. 11 is a flowchart showing generally the steps involved in a service request termination sequence.

The method and operation of the invention will be more fully understood by reference to the flow charts of FIG. 7 through FIG. 11. FIG. 7 is flowchart showing generally the steps involved in registering slave devices. FIG. 8 is a flowchart showing generally the steps involved in a data link request sequence. FIG. 9 is a flowchart showing generally the steps involved in a data link service request sequence. FIG. 10 is a flowchart showing generally the steps involved in a data link termination sequence. FIG. 11 is a flowchart showing generally the steps involved in a data link termination service request sequence. In FIG. 7 through FIG. 11, where steps include protocol messages from a first device to a second device, the invention provides a service retransmission request (SRQ) protocol. In this framework, if a protocol message from the sequence fails to reach its intended target recipient, the entire protocol sequence will be reinitiated while keeping the state of the intended target recipient unchanged. The order of steps as shown in FIG. 7 through FIG. 11 and described below are only exemplary, and should not be considered limiting.

Referring now to FIG. 7, as well as FIG. 2 through FIG. 6, there is shown generally the method of registering an offline slave device. This method is also referred to as the discovery (DISC) sequence 60 as described in FIG. 5.

At step 100, the master device 34 periodically broadcasts an ALOHA message in the command section 46 of the TDMA frame 42 to ascertain or otherwise detect "unregistered" or "offline" slave devices. The ALOHA broadcasts is additionally transmitted to invite other protocol messages from "online" slave devices. The ALOHA broadcast is transmitted at a predetermined interval.

At step 110, ALOHA broadcast has been transmitted and is in transit to the slave devices 36a through 36n of the network 32. As noted above various errors may arise during the transmission of network messages in the system 32, including the ALOHA broadcast. When errors during transmission sufficiently corrupt the ALOHA message, step 100 is repeated according to the periodic rate for the ALOHA broadcast. This result is a function of the SRQ protocol scheme of the present invention wherein if a protocol message fails to reach its intended target recipient, the state of the intended target recipient remains unchanged and the sequence is restarted. If the ALOHA message is received by an offline slave device, step 120 is carried out.

At step 120, a slave device in the offline state 54 receives the ALOHA broadcast from the master device 34. In response to the ALOHA message, the offline slave device transmits a discovery (DISC) message in the CMD 82 slot of the next immediate frame. The slave device additionally transmits its identification number in the ID 80 slot to identify itself to the master device 34.

At step 130, the DISC response has been transmitted and is in transit to the master device 34. When a transmission error occurs preventing the master device 34 from ascertaining the DISC response, step 140 is carried out. Otherwise, if the master device receives the DISC response, steps 150 through 170 are carried out.

At step 150, the master device 34 receives DISC response and the identification number of the offline slave device. The master device interprets the DISC command as a request from the identified slave device to transition to online status 56. Responsive to this DISC message, the master device replies with a M-ACK message indicating that the request has been acknowledged and approved. Step 160 is then carried out.

At step 160, the master device 34 updates the master table in the master device 34 to indicate that the identified device in step 150 is now online 56. The requesting slave device of step 120 is now considered "online" and available for communication with other online devices of the network system. Step 170 is then carried out.

At step 170, the slave device receives the M-ACK acknowledgement message that was transmitted in step 150 by the master device 34. The slave device interprets the M-ACK message as an authorization and acceptance of the request of the slave device to transition to online. Responsive to the M-ACK acknowledgement, the slave device sets its internal state to online to comply with the master table, which indicates the slave device's availability for communication with other online devices of the network. Step 100 is then repeated as defined by the periodic rate of transmission defined for the system.

At step 140, a transmission error occurred during the transmission of the DISC reply of step 120. Certain collision errors may arise when more than one slave device transmits a DISC signal in response to the ALOHA broadcast of step 100. Collisions cause corruption to the frame thus preventing the master device 34 from ascertaining, among other things, the identification code of the slave devices. When a collision error arises, step 180 is carried out to provide error correction. Otherwise, the DISC reply is lost and the requesting slave device of step 120 remains offline during this exchange. This result is an aspect of the SRQ protocol scheme of the present invention to avoid inconsistencies with regard to the state of the slave devices when protocol exchange sequences are interrupted by errors. Step 100 is then carried out again.

At step 180, collision error-recovery functions are executed by the master device 34, wherein the master device retransmits an ALOHA message while the colliding slaves wait for a random repetition of the ALOHA broadcasts until each of them can retry the DISC process.

Referring next to FIG. 7, as well as FIG. 2 through FIG. 6, there is shown generally the method of requesting a data link (REQ) 66. This protocol exchange arises when a requesting or source slave device requests a data link with a second target slave device. The data link, once established, allows the two slave devices to transmit data to each other via one or more assigned data slots 48a through 48n.

At step 190, the master device 34 periodically transmits an ALOHA broadcast in the command section 46 of the TDMA frame 42 to invite protocol messages from "online" slave devices.

At step 200, a requesting slave device receives the ALOHA broadcast of step 190. Responsive to the ALOHA broadcast, the requesting slave device transmits a data link request REQ in the CMD block 82 of the next immediate frame to the master device 34. The requesting slave also transmits its identification number in the ID slot 80 and the target slave device identification number in the OPND slot 84 within the frame.

At step 210, the master device 34 receives the REQ message of step 200 which identifies the requesting slave device and the target slave device. The master device 34 queries the master table to ascertain the state of the requesting device of step 200. In general a slave device can only be engaged for a data link with one other slave device. Thus, if the requesting device is presently engaged in a data link with another slave device according to the master table, such data link must first be terminated before a new data link request is authorized by the master device 34. Also, as described above, a slave device must first be registered as online with the master device 34 before such slave device communicates with a second slave device. In this regard, a slave device which is "offline" according the master table is denied a data link request. If the master table indicates that the requesting device is in an online state, then step 260 is carried out. Otherwise the requesting device is either offline or engaged, and step 230 is carried out.

At step 230, the master device 34 determines whether the requesting device is offline or engaged according to the master table. If the requesting device is already engaged, then its current data link must first be terminated, and steps 240 and 250 are carried out. Otherwise, the requesting device is offline, and its data link request is denied, and step 190 is carried out again.

At step 240, the master device 34 determines that the requesting device of step 200 is already engaged in communication with another slave device as indicated in the master table. The master table includes information regarding, among other things, the identification number of the requesting device, the state of the requesting device, and if the requesting device is already engaged, the identification number of the current or existing partner or target slave device. The master device 34 interprets a request for a new data link as carried in 200 from a slave device which is already engaged in a data link as a request to terminate the requesting device's current data link connection with its current target device. The master device 34 changes the state of the requesting device of step 200 from "engaged" to "online". Step 250 is then carried out to terminate the existing data link exchange with the existing target device.

At step 250, the master device 34 carries out the STERM sequence for terminating the data link ascertained in step 230. The STERM sequence is described further below in connection with FIG. 11. Step 190 is then carried out again.

At step 260, the master device 34 queries the master table to ascertain the state of the target device requested by the slave device of step 200. In general a slave device can only be engaged in a data link with one other slave device. If the target device is presently engaged in a data link with another slave device according to the master table, the requesting device is denied a data link with such presently engaged target device. If the master device 34 determines that target device is already engaged, step 280 is carried out. Otherwise, step 290 is carried out.

At step 280, the master device 34 transmits a M-BUSY message in CMD slot 82 directed to the requesting device of step 200 to indicate that the target device requested in step 200 is already engaged in communication with another slave device. Step 190 is then carried out again.

At step 290 the master device 34 ascertains whether the target device requested by the slave device of step 200 is offline. If the target device is already offline according to the master table, then such target device is not available for network communication, and step 300 is carried out. Otherwise the target device is online and available for communication, and step 310 is carried out.

At step 300, the master device 34 transmits a M-NACK message in CMD slot 82 directed to the requesting device of step 200 to indicate that the target device requested in step 200 is offline and unavailable for network communication at the present time. Step 190 is then carried out again.

At step 310, the master device 34 determines that the target device is online and available for the data link request of step 200. Master device transmits an M-ACK acknowledgement message in CMD slot 82 to the requesting device to indicate that the data link request of step 200 has been authorized. Step 320 is then carried out.

At step 320, the requesting device receives the M-ACK message of step 310. The requesting device interprets the M-ACK message as authorization to proceed with a data link with the target device. The requesting device transitions its internal state from online 56 to engaged 58 additionally storing the identification number of the target device with the engaged state. Step 325 is then carried out.

At step 325, the master device 34 carries out a SREQ service request sequence as described below with FIG. 9. After the SREQ is completed, step 328 then carried out.

At step 328, the master device 34 engages in a protocol engage sequence with the requesting device to change the requesting device's state to "online".

Referring now to FIG. 9 and FIG. 7, as well as FIG. 1 through FIG. 6, there is shown generally the method of requesting a service request (SREQ) 68. These steps are carried out after step 330 of the REQ 66 sequence as described above for FIG. 8.

At step 340, the master device 34 begins the service request sequence by transmitting a SREQ message to the target device. The SREQ message includes the SREQ message in the CMD slot 82 and the identification number of the target slave device in the OPND slot 84 to indicate a data link request has been made by the requesting device identified in the OPND slot 84. The SREQ message also includes the identification number of the requesting slave device in the ID slot 80?. Step 350 is then carried out.

At step 350, the target device receives the SREQ message from step 340. The target device queries its internal state information to determine the current state of the target device. Step 360 is then carried out.

At step 360, the target device makes a determination whether it is already engaged in a data link communication with another slave device other than the currently requesting device indicated in the SREQ message of step 340. As noted above, a slave device is generally only engaged in a data link to one other slave device. If the target device is currently engaged in a data link with a slave device other than the requesting device, step 370 is carried out. Otherwise, step 380 is carried out.

At step 370, the target transmits a BUSY message in the CMD slot 82 to the master device 34 to indicate the target device is currently engaged in a data link communication with a different slave device. The BUSY message also indicates the identification number of the slave device which the target is currently engaged with in the OPND slot 84. Step 375 is then carried out.

At step 375, the master device 34 receives the BUSY message of step 370. The master device interprets this BUSY message as an error because the master table does not indicate that the target device is in the engaged state 58 as determine in step 270 of FIG. 8 which was described above. Responsive to this recognized error, the master device proceeds to terminate the current data link identified in the BUSY message of step 370 by carrying out a STERM 72 sequence as described in more detail below in conjunction with FIG. 11.

At step 380, the target device makes a determination whether it is already engaged in a data link communication with the currently requesting device indicated in the SREQ message of step 340. If the target is already engaged in a data link communication with the currently requesting device, step 390 is carried out. Otherwise step 410 is carried out.

At step 410, the target device determines whether it is in the online state 56. As noted above, only online devices participate in network communication. Devices which are offline 54 must first register with the master device 34 as described in FIG. 7. If the target device is online, then step 420 is carried out. If the device is offline, the device does not reply to the SREQ message of step 340.

At step 420, the target device changes its internal state from online 54 to engaged 56 to indicate it is engaged in communication with the requesting device and additionally indicating the identification number of the requesting device with the internal state. Step 390 is then carried out.

At step 390, the target device transmits an ACK message to the master device 34 to indicate its acknowledgement of the SREQ message of step 340 and its acceptance of the data link request. Step 400 is then carried out.

At step 400, the master device receives the ACK message of step 390. The master device interprets the ACK message from the target device as a confirmation of the success of the SREQ message of step 340 and that the desired state in the target device has been achieved. The master device 34 updates the master table to indicate that the requesting device is now engaged with the target device by specifying the identification number of the requesting device and the target device and the engaged state for both devices. At the completion of step 400, the requesting device and the slave device are authorized to engage in data link communication exchange.

Referring next to FIG. 10, as well as FIG. 2 through FIG. 9, there is shown generally the method of terminating a data link TERM 70. After a requesting slave device completes its data link communication with its partner or target slave device, the requesting device proceeds with the TERM sequence steps described herein.

At step 430, the master device 34 periodically transmits an ALOHA broadcast in the command section 46 of the TDMA frame 42 to invite protocol messages from "online" slave devices.

At step 440, the requesting slave device receives the ALOHA message of step 430 and replies with a TERM message in the CMD slot 82 in the immediate next frame to indicate a request to terminate the data link with the currently engaged target and partner slave device. The TERM message also includes the identification number of the requesting slave device in the ID slot 80 and the identification number of the 84 slot. Step 450 is then carried out.

At step 450, the master device 34 receives the TERM message of step 440. In response to this TERM message, the master device 34 queries the state of the requesting device in the master table. Step 460 is then carried out.

At step 460, the master device 34 determines whether the requesting device is online according to the master table. If the requesting device is online 56 according to the master table, step 490 is carried out. Otherwise, step 470 is carried out.

At step 490, the master device 34 transmits a M-ACK message to the requesting device to indicate its TERM message has been accepted and authorized. Step 500 is then carried out.

At step 500, the slave device requesting data link termination TERM of step 440 receives the M-ACK message of step 490. The requesting slave device interprets the M-ACK message as an authorization to transition to online status 56. The requesting slave device updates its internal state from "engaged" to "online" and stops transmitting and/or receiving data from its partner device. The requesting device and master device may further engage in a confirmation sequence to verify the state change of the requesting device. Step 502 is then carried out.

At step 502, the master device 34 the queries the state of the target device in the master table. Step 504 is then carried out.

At step 504, the master device 34 determines whether the target device is engaged according to the master table. If the target device is engaged 58 according to the master table, step 506 is carried out. Otherwise, a service terminate sequence is inappropriate.

At step 506, the master device 34 proceeds with a STERM sequence with the target device indicated in the TERM message of step 440. The STERM sequence is described in further detail below in conjunction with FIG. 11.

At step 470, the master device 34 ascertains whether the slave device requesting data link termination TERM from step 440 is engaged according to the master table. If the requesting device is not engaged, the requesting device is offline and unavailable for communication. Requests from such offline devices are not replied to. If the requesting device is engaged, step 480 is carried out.

At step 480, the master device 34 updates the state information in the master table for the requesting device from engaged 58 to online 56 to reflect the termination of the data link and to indicate the requesting device's availability for communication. Steps 490 and 500 are then carried out.

Referring now to FIG. 11 and FIG. 10, as well as FIG. 2 through FIG. 9, there is shown generally the method of terminating a service request STERM 72. The STERM 72 sequence as described below is carried out as a second phase of a data link termination between a first slave device and a second slave device engaged in communication, the first phase comprising the steps carried out in conjunction with FIG. 10.

At step 510, the master device issues a STERM message to a target device to request that the target device disengage from its current data link. The STERM command is communicated in the CMD slot 82, along with the identification number of the target device in the OPND slot 84 and the identification number of the source or requesting device in the ID slot 80. The master device may issue a "universal" code for the identification number of the source or requesting device in special cases, including, for example, state information mismatches as described further below in connection with step 550. Step 520 is then carried out.

At step 520, the target device receives the STERM message of step 510 and in response to this STERM message, queries its internal state to ascertain its current operating state. The target device also determines the identification number source or requesting device from the STERM message communicated in step 510. Step 530 is then carried out.

At step 530, the target device makes a determination whether the target device is engaged in a data link communication with a device other than the source or requesting device communicated in the STERM message of step 510. A "universal" identification code in the "source" ID slot 80 is not interpreted by the target device as a device "other than the source", but rather the same as the source. If target determines that it is engaged in a data link other than the source or requesting device, steps 540 and 550 are carries out Otherwise, step 560 is carried out.

At step 540, the target has determined that it is engaged in a data link other than the source or requesting device. In such case, a serious error has been detected by the target device because the internal state of the target device indicates that the target device is engaged with a device other than the source device as determined by the master device from the master table. The target device reports this error via a NACK message in the CMD slot 82. Step 550 is then carried out.

At step 550, the master device 34 receives the NACK message issued in step 540. The master device 34 interprets this NACK message as a serious error because of the state information conflict between master table and the internal state kept by the target device as described above. To correct this problem the master device 34 issues another STERM message in the CMD slot 82 to the target device, identifying a "universal" source or requesting device identification number in the ID slot 80. Providing a "universal" code for the source or requesting device forces the target device to terminate its current data link connection as described below in connection with step 570 because a "universal" code is not interpreted by the target as a different source device in step 530. Step 520 is then carried out.

At step 560, the target device makes a determination whether the target device is engaged in a data link communication with the source or requesting device communicated in the STERM message of step 510. As noted above, a "universal" identification code in the "source" ID slot 80 is considered the same as the source or requesting device for purposes of this determination. If the target determines that it is engaged with the specified source device, then step 570 is carried out. Otherwise step 580 is carried out.

At step 570, the target device terminates its current data link communication. The target device further updates its internal state from engaged 58 to online 56 to indicate its termination of its engaged communication and its availability for other communication. Step 590 is then carried out.

At step 580, the target device has determined that it is not engaged from steps 530 and 560. The target now determines whether its state is online 56 or offline 54. If the target is offline 54, it does not respond to the STERM message of 510 because online devices are not available for communication in the network. If the target is online 56, step 590 is carried to indicate that its internal state is online 56.

At step 590, the target device transmits an ACK message in the CMD slot 82 to the master device 34 to indicate it is now in the online 56 state and that it is not currently engaged in a data link communication with another device on the network. Step 600 is then carried out.

At step 600, the master device 34 receives the ACK message of step 590. This ACK message is interpreted by the master device 34 that the STERM message has been effective and the desired state at the target device has been achieved. The master device 34 then updates the state information of the target device in master table from engaged 58 to online 56 to indicate that the target device is now available for a data link communication.

Accordingly, it will be seen that this invention provides a MAC protocol and method for use in a network system which allows for centralized management of all network communication, where a common channel is shared between protocol messages as well as data transmissions. The invention improves the throughput of protocol messages, reduces the latency of data transmissions, and provides a set of failure management methods. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for transmitting data between a master device and a plurality of slave devices in Medium Access Control protocol messages comprising:
   transmitting an ALOHA message from said master device to said plurality of slave devices;
   transmitting a data link request message from a one of said plurality of slave devices acting as a source slave device to said master device requesting a data transmission to a second of said plurality of device acting as a target slave device;
   verifying an on-line state of said source slave device by said master device in response to receiving said data link request in said master device;
   verifying a on-line state of said target slave device responsive to receiving said data link message;
   transmitting a service link request to said target slave device from said master device in response to a verification said target slave device is in an on-line state;
   receiving an acknowledgement message from said target slave device in said master device in response to said service request link;
   assigning a data slot to said source device in response to a verification said source device is in an on-line state and receiving said acknowledgement message from said target slave device;
   transmitting said data slot to said source device in response to assigning said data slot; and
   updating a master table in said master device indicating said source slave device is in an engaged state responsive to said assigning of said data slot.

2. The method of claim 1 further comprising:
   updating an internal state of said source slave device to engaged responsive to receiving said data slot.

3. The method of claim 1 further comprising:
   updating said master table in said master device to indicate said target slave device is engaged responsive to said assignment.

4. The method of claim 1 further comprising:
   updating an internal state of said target slave device to engaged responsive to receiving said service link request.

5. The method of claim 1 further comprising:
   determining an internal state of said target slave device in response to receiving said service link request; and
   transmitting said acknowledge signal in response to a determination said target slave device is in an on-line internal state.

6. The method claim 5 further comprising:
transmitting a busy message in response to a determination said target slave device is in an engaged internal state with a third of said plurality of slave devices.

7. The method of claim 6 further comprising:
receiving said busy message in said master device; and
terminating a current data link of said target slave device in response to receiving said busy message.

8. The method of claim 1 further comprising:
receiving a discovery message from a one of said plurality of slave device;
transmitting an acknowledgement message from said master device to said one of said plurality of slave device in response to receiving said discovery message; and
updating said master table in said master device to indicate said one of said plurality of slave devices is in an on-line state.

9. The method of claim 8 further comprising:
receiving said acknowledgement message in said one of said plurality of slave devices; and
updating said internal state of said one of said plurality of slave device to on-line in response to receiving said acknowledge.

10. The method of claim 8 further comprising:
re-transmitting said discovery message from said one of said plurality of slave devices in response to said acknowledgement signal not being received.

11. A system for providing data transmissions in a network having a master device and a plurality of slave devices using a Medium Access Protocol comprising:
instructions for directing a processing unit in said master device to:
transmit an ALOHA message to said plurality of slave devices,
receive a data link request message from a one of said plurality of slave devices acting as a source slave device requesting a data transmission to a second of said plurality of device acting as a target slave device,
verify an on-line state of said source slave device in response to receiving said data link request,
verify a on-line state of said target slave device responsive to receiving said data link message,
transmit a service link request to said target slave device from said master device in response to a verification said target slave device is in an on-line state,
receive an acknowledgement message from said target slave device in said master device in response to said service request link,
assign a data slot to said source device in response to a verification said source device is in an on-line state and receiving said acknowledgement message,
transmit said data slot to said source slave device in response to assigning said data slot, and
update a master table indicating said source slave device is in an engaged state responsive to said assigning of said data slot; and
a media readable by said processing unit in said master device for storing said instructions.

12. The system of claim 11 further comprising:
instructions for directing a processing unit each of said plurality of updating an internal state of said source slave device to engaged responsive to receiving said data slot; and
a media readable by said processing unit in each of said plurality of slave devices for storing said instructions.

13. The system of claim 11 wherein said instructions for directing said processing unit in said master device further comprise:
instructions for directing said processing unit in said master device to:
update said master table to indicate said target slave device is engaged responsive to said assignment.

14. The system of claim 11 further comprising:
instructions for directing a processing unit in said slave target device to:
update an internal state of said target slave device to engaged responsive to receiving said service link request; and
a media readable by said processing unit in said slave target device for storing said instructions.

15. The system of claim 11 further comprising:
instructions for directing a processing unit in said slave target device to:
determine an internal state of said target slave device in response to receiving said service link request, and
transmit said acknowledge signal in response to a determination said target slave device is in an on-line internal state; and
a media readable by said processing unit in said target slave device for storing said instructions.

16. The system of claim 15 wherein said instructions for directing said target slave device further comprise:
instructions for directing said processing unit in said slave target device to:
transmit a busy message in response to a determination said target slave device is in an engaged internal state with a third of said plurality of slave devices.

17. The system of claim 16 wherein said instructions for directing said processing unit in said master device further comprise:
instructions for directing said processing unit in said processing unit to:
receive said busy message; and
terminate a current data link of said target slave device in response to receiving said busy message.

18. The system of claim 11 wherein said instructions for directing said processing unit in said master device further comprise:
instructions for directing said processing unit in said master device to:
receive a discovery message from a one of said plurality of slave device,
transmit an acknowledgement message from said master device to said one of said plurality of slave device in response to receiving said Discovery message; and
update said master table in said master device to indicate said one of said plurality of slave devices is in an on-line state.

19. The system of claim 18 further comprising:
instructions for directing a processing unit in a one of said plurality of slave device to:
receive said acknowledgement message in said one of said plurality of slave devices, and
update said internal state of said one of said plurality of slave device to on-line in response to receiving said acknowledge; and
a media readable by said processing unit in said one of said plurality of slave device for storing said instructions.

* * * * *